United States Patent
Yacovitch

(10) Patent No.: US 9,351,197 B2
(45) Date of Patent: May 24, 2016

(54) WIRELESS ACCESS POINT ASSIGNMENT

(75) Inventor: Robert Daniel Yacovitch, St. Laurent (CA)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 3 days.

(21) Appl. No.: 14/347,286

(22) PCT Filed: Jan. 6, 2012

(86) PCT No.: PCT/US2012/020437
§ 371 (c)(1),
(2), (4) Date: Mar. 26, 2014

(87) PCT Pub. No.: WO2013/103349
PCT Pub. Date: Jul. 11, 2013

(65) Prior Publication Data
US 2014/0313901 A1 Oct. 23, 2014

(51) Int. Cl.
| | | |
|---|---|---|
| G06F 11/00 | (2006.01) | |
| H04J 1/16 | (2006.01) | |
| H04L 12/26 | (2006.01) | |
| H04W 28/12 | (2009.01) | |
| H04W 28/08 | (2009.01) | |
| H04W 72/04 | (2009.01) | |
| H04W 48/20 | (2009.01) | |

(Continued)

(52) U.S. Cl.
CPC .............. *H04W 28/12* (2013.01); *H04W 28/08* (2013.01); *H04W 48/20* (2013.01); *H04W 72/0433* (2013.01); *H04W 28/16* (2013.01); *H04W 72/0486* (2013.01); *H04W 72/10* (2013.01); *H04W 88/08* (2013.01)

(58) Field of Classification Search
CPC ..... H04W 28/12; H04W 48/20; H04W 28/08; H04W 72/0433
USPC ................. 370/252, 253, 254, 255, 328, 329; 455/552.1, 73
See application file for complete search history.

(56) References Cited

U.S. PATENT DOCUMENTS 5,697,059 A 12/1997 Carney
9,060,269 B2 * 6/2015 Wang .................... H04W 16/04
(Continued)

FOREIGN PATENT DOCUMENTS

WO WO-2006/026679 A1 3/2006

OTHER PUBLICATIONS

Yu, M. et al.; "Dynamic Radio Resource Management Technique for Multiple APs in WLANs"; vol. 5, Issue 7; Jul 2006; pp. 1910-1919.
(Continued)

*Primary Examiner* — Chuong T Ho
(74) *Attorney, Agent, or Firm* — Hewlett Packard Enterprise Patent Department

(57) ABSTRACT

Embodiments disclosed herein relate to wireless access point assignment. In one embodiment, a client device is assigned to a wireless access point. For example, the client device may be assigned to the wireless access point based on network traffic associated with the client device. The client device may be assigned to the wireless access point based on the communication protocol of the client device. In one embodiment, a radio channel is assigned to a wireless access point based on a time based network traffic pattern associated with the wireless access point.

14 Claims, 11 Drawing Sheets

(51) Int. Cl.
*H04W 28/16* (2009.01)
*H04W 88/08* (2009.01)
*H04W 72/10* (2009.01)

(56) References Cited

U.S. PATENT DOCUMENTS

| | | |
|---|---|---|
| 2006/0133404 A1 | 6/2006 | Zuniga et al. |
| 2007/0197256 A1* | 8/2007 | Lu .................. H04B 1/406 455/552.1 |
| 2007/0217377 A1 | 9/2007 | Takeuchi |
| 2007/0249291 A1* | 10/2007 | Nanda ............ H04W 36/0083 455/73 |
| 2008/0008116 A1 | 1/2008 | Buga et al. |
| 2009/0190500 A1 | 7/2009 | Ji |
| 2009/0296574 A1 | 12/2009 | Liao et al. |
| 2010/0216477 A1 | 8/2010 | Ryan |
| 2010/0220676 A1 | 9/2010 | Grandblaise et al. |
| 2010/0311435 A1 | 12/2010 | Mueck |
| 2011/0028144 A1 | 2/2011 | Catovic et al. |
| 2011/0058478 A1 | 3/2011 | Krym |
| 2012/0157106 A1* | 6/2012 | Wang .................. H04W 16/04 455/446 |
| 2013/0089001 A1* | 4/2013 | Dattagupta .......... H04W 48/20 370/255 |
| 2015/0281977 A1* | 10/2015 | Wang .................. H04W 16/04 370/253 |

OTHER PUBLICATIONS

Extended European Search Report, EP Application No. 12864664.3, Date: Jul. 8, 2015, pp. 1-7.

* cited by examiner

```
Client Device 1    high traffic
Client Device 2    low traffic     — 300
Client Device 3    low traffic
```

```
Wireless Access Point Assignments

Client Device 1 – Wireless Access Point B      — 301
Client Device 2 – Wireless Access Point A
Client Device 3 – Wireless Access Point A
```

*FIG. 3*

WIRELESS ACCESS POINT ASSIGNMENT

BACKGROUND

Wireless networks allow client devices to wirelessly connect to wireless access points to receive network access. A central network controller may control the wireless access points, for example, by selecting radio channels for transmission by the wireless access points. The central network controller may control the network configuration, such as by determining which wireless access point a client device connects to.

BRIEF DESCRIPTION OF THE DRAWINGS

The drawings describe example embodiments. The following detailed description references the drawings, wherein:

FIG. 3 is a diagram illustrating one example of assigning client devices to wireless access points based on network traffic data.

DETAILED DESCRIPTION

A wireless network may involve client devices communicating wirelessly with a wireless access point to access a network. A network controller may analyze network patterns, such as client device characteristics or traffic patterns, to determine how to configure wireless access points. For example, a network controller may determine which client devices to assign to a wireless access point and which radio channel to assign to a wireless access point.

As an example, a network controller may assign client devices to wireless access points based on the traffic patterns of the client devices. Client devices with greater traffic or a higher priority type of traffic may be assigned to a wireless access point likely to provide greater throughput to the client device than a client device previously associated with a lower amount of network traffic.

As another example, client devices may be assigned to wireless access points based on the communication protocol use by the client devices. For example, client devices using an older wireless technology may connect to a different wireless access point than client devices communicating using a newer communication protocol. For example, client devices communicating using 802.11n may access a network through a first wireless access point and client devices communicating using 802.11a may access the network through a second wireless access point.

As another example, a network controller may analyze network traffic patterns associated with a wireless access point and assign a radio channel to the wireless access point based on the traffic patterns. For example, the radio chancel may be selected to reduce co-channel interference and increase throughput for the wireless access point that has a greater level of traffic. The radio channel may be assigned for a particular time period. For example, a first radio channel may be assigned to the wireless access point for Tuesdays, and a second radio channel may be assigned to the wireless access point for Saturdays.

Figure 1:
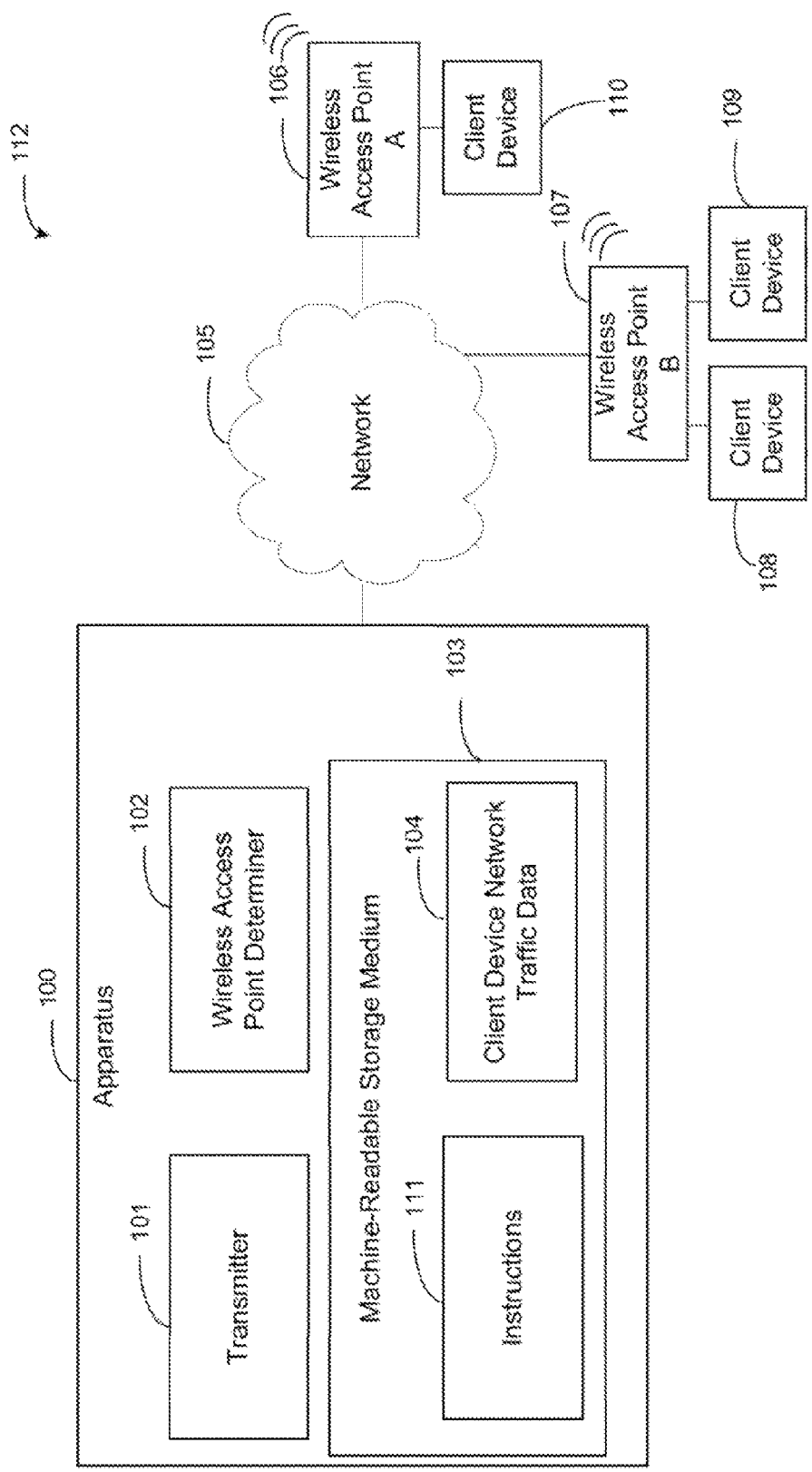
FIG. 1 is a block diagram illustrating one example of a computing system.

FIG. 1 is a block diagram illustrating one example of a computing system 112. The computing system 112 may be a network in which a central network controller determines which wireless access point to associate with a particular client device. For example, network traffic originating from the client devices may be analyzed to determine how to allocate the client devices among the wireless access points. The computing system 112 may include an apparatus 100, a network 105, a wireless access point A 106, a wireless access point B 107, a client device 108, a client device 109, and a client device 110.

The wireless access point A 106 and the wireless access point B 107 may be any suitable wireless access points. The wireless access points A 106 and B 107 may be used to provide wireless network access to client devices, such as by transmitting information wirelessly via radio frequencies to client devices 108, 109, and 110. In some implementations, the wireless access points A 106 and B 107 may be combined with other network hardware, such as a router.

The client devices 108, 109, and 110 may be, for example, desktops, laptops, or mobile computing devices. The client device 108, 109, and 110 may be client devices that wirelessly connect to the network 105, For example, the client devices 108, 109, and 110 may receive access to the network 105 via a wireless access point, such as wireless access point A107 or wireless access point B 108. The wireless access points A 107 and B 108 may wirelessly transmit data to the client devices associated with the wireless access points. For example, wireless access point B 107 may wirelessly transmit data to the client devices 108 and 109, and wireless access point A 106 may wirelessly transmit data to the client device 110.

The network 105 may be, for example, the Internet or a Local Area Network (LAN). The network 105 may be used to communicate information to the wireless access points A 106 and B 107 about which client devices they should associate with. The network 106 may be a wired network for transmitting information to the wireless access points A 106 and B 107, and the wireless access points A 106 and 107 may wirelessly transmit the information to client devices.

The apparatus 100 may be any suitable apparatus for controlling network parameters. For example, the apparatus 100 may be a network controller, such as a wireless Local Area Network (LAN) controller, for centrally managing radio frequency power, channel, authentication, and security of wireless access points. The apparatus 100 may determine which wireless access point to associate with a client device. The apparatus 100 may include a transmitter 101, a wireless access point determiner 102, and a machine-readable storage medium 103.

The wireless access point determiner 102 may be, for example, processor, such as a central processing unit (CPU), a semiconductor-based microprocessor, or any other device suitable for retrieval and execution of instructions. In one embodiment, the wireless access point determiner 102 includes logic instead of or in addition to a processor. As an alternative or in addition to fetching, decoding, and executing instructions, the wireless access point determiner 102 may include one or more integrated circuits (ICs) or other electronic circuits that comprise a plurality of electronic components for performing the functionality described below. In one implementation, the wireless access point determiner 102 includes multiple processors. For example, one process cc may perform some functionality and another processor may perform other functionality.

The machine-readable storage medium 103 may be any suitable machine readable medium, such as an electronic, magnetic, optical, or other physical storage device that stores executable instructions or other data (e.g., a hard disk drive, random access memory, flash memory, etc.). The machine-readable storage medium 103 may be, for example, a computer readable non-transitory medium.

The machine-readable storage medium 103 may include client device network traffic data 104. The client device network traffic data 104 may include data related to network traffic originating from each client device. The client device network traffic data 104 may include information about time based traffic patterns related to, for example, a time of day or a day of the week.

The machine-readable storage medium 103 may include instructions 111 executable by the wireless access point determiner 102. The instructions 111 may include instructions executable by the wireless access point determiner 102 to analyze the client device network traffic data 104 to determine which wireless access point to assign to a client device for network connectivity. The wireless access point determiner 102 may use the dent device network traffic data 104 to determine a wireless access point assignment for a client device likely to result in better throughput, such as by allocating client devices in a manner likely to more evenly distribute network traffic among wireless access points. For example, based on an analysis of the client device network traffic data 104, the wireless access point determiner 102 may assign client device 108 to wireless access point B 107.

The transmitter 101 may be, for example, a hardware component of the apparatus 100 for transmitting information via the network 105 to the wireless access points A 106 and B 107. The transmitter 101 may transmit client device assignment information determined by the assignment determiner 102 to the wireless access points A 106 and B 107. For example, the transmitter 101 may transmit information to the wireless access point A 106 indicating that client device 108 and client device 109 is assigned to it, and wireless access point A 106 may connect to the client devices 108 and 109 when they attempt to connect to the network 105.

Figure 2:
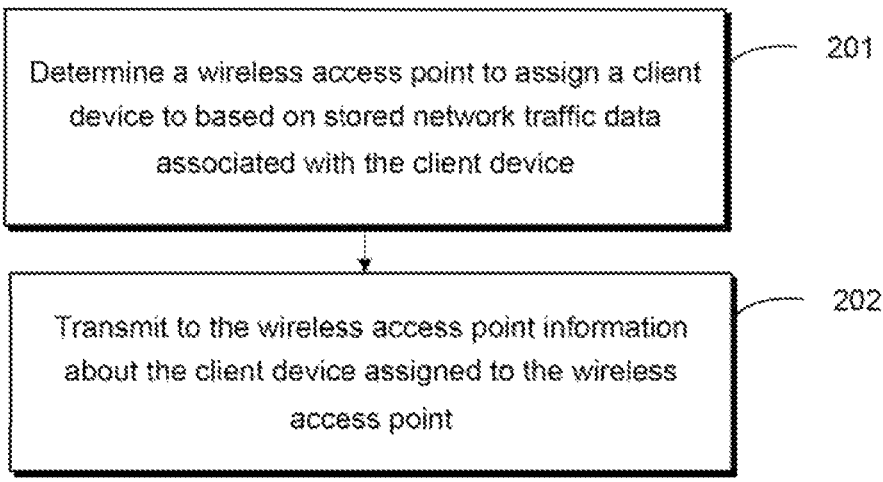
FIG. 2 is a flow chart illustrating one example of a method to assign a client device to a wireless access point based on stared network traffic data.

FIG. 2 is a flow chart 200 illustrating one example of method to assign a client device to a wireless access point based on stored network traffic data. For example, network traffic history data may be analyzed, and client devices may be assigned to a wireless access point based on the analysis. The past traffic pattern data may be indicative of future traffic patterns. The traffic patterns may be time based, for example, showing an average amount of past traffic at different time periods. In some cases, the client devices may be assigned in a manner designed to increase the throughput of network traffic of client devices or a group of client devices. If a first wireless access point receives =wore network traffic than a second wireless access point, the first wireless access point may provide lower throughput to its client devices because more client devices may be communicating on the same radio channel used by the first wireless access point. The client devices may be assigned to different wireless access points at different time periods based on the time based traffic patterns. In some cases, a client device may not be assigned to the closest wireless access point to the client device. The method may be implemented, for example, by the apparatus 100 from FIG. 1.

Beginning at 201, a wireless access point determiner, such as the wireless access point determiner 102 from FIG. 1, determines a wireless access point to assign a client device to based on stored network traffic data associated with the client device. For example, the wireless access point determiner may examine historical network traffic data or patters determined based on historical network traffic data. The wireless access point determiner may assign a client device to a wireless access point, for example, based on the amount of traffic associated with the client device or the type of network traffic associated with the client device. The assignment may be done to increase throughput for a particular type of network traffic, a particular type of client device, such as a client device associated with a particular type of user, or to even out the throughput across client devices. In some implementations, the assignment may be updated as new traffic pattern data is received or at a particular interval.

The wireless access point determiner may collect the network traffic data or receive the network traffic data. In some cases, the wireless access point determiner receives summary information about the network traffic data, such as information about patterns of high network traffic.

The assignment may be updated or may be different according to time. For example, a client device may be assigned to a first wireless access point in the morning and to a second wireless access point in the afternoon based on a pattern indicating that the client device in the past had more network traffic in the afternoon.

As another example, a particular conference room may create a greater amount of network traffic from 8 until 9 each morning due to a daily meeting. The wireless access point determiner may receive information about the pattern of traffic for the client devices indicating increased traffic during the time period of the meeting. The client devices in that conference room may be assigned to different wireless access point during the meeting time than during the rest of the day.

In one implementation, the client devices are assigned to wireless access points is a manner designed to provide optimal network access for the client devices as a whole, such as where one client device does not have a much greater throughput than another client device. In one implementation, client devices are prioritized relative to one another. For example, clients may be prioritized based on the type of network traffic or the type of user of the client device. The client devices may then be assigned to wireless access points in a manner that increases throughput for client devices of greater priority. For example, client devices showing historical network traffic data associated with video editing may be given a higher priority than client devices showing historical network traffic data associated with website surfing.

Continuing to 202, a transmitter, such as the transmitter 101, transmits to the wireless access point information about the client device assigned to the wireless access point. The transmitter may transmit information to the wireless access point via a wired network. When the client device attempts to connect to the network, the wireless access point assigned to the client device begins to wirelessly communicate with the client device to provide network access to the client device.

FIG. 3 is a diagram illustrating one example of assigning client devices to wireless access points based on network traffic data. Block 300 shows historical network traffic data. For example, data collected about past network traffic indicates that client device 1 has high traffic, client device 2 has low traffic, and client device 3 has low traffic. Block 301 shows the wireless access point assignments. The two client devices with low traffic, client devices 2 and 3, are associated with wireless access point A, and the client device with high traffic, client device 1, is associated with wireless access point B. The wireless access points A and B may communicate using different radio channels. Client devices 2 and 3 may communicate using the same radio channel associated with wireless access point A. Client device 1 may communicate using another radio channel associated with wireless access point B. As a result, client device 1 may not experience co-channel interference with client devices 2 and 3. Although client devices 2 and 3 share a radio channel, they may not experience interference issues because of the tower traffic level predicted to be associated with each of them. If the higher traffic client device 1 shared a radio channel with client devices 2 or 3, interference may be more likely because of the high amount of traffic originating with client device 1.

Figure 4:
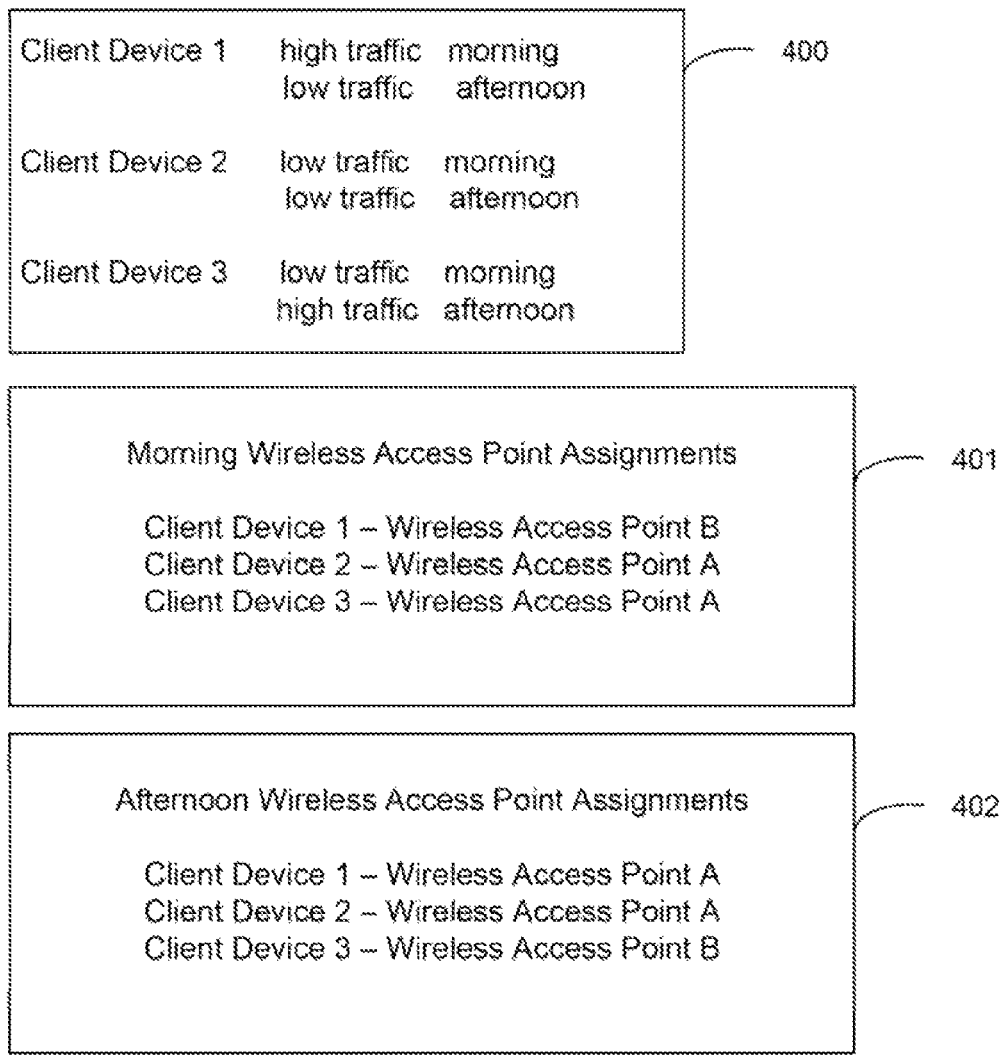
FIG. 4 is a diagram illustrating one example of assigning client devices to wireless access points based on time based network traffic data.

FIG. 4 is a diagram illustrating one example of assigning client devices to wireless access points based on time based network traffic data. Historical network traffic data may reveal that a client device has a pattern of network traffic based on time, such as time of day, day of week, month of year, or other time based pattern. For example, a client device may have a low amount of network traffic on the weekends, but a high amount of network traffic during the week. Block 400 shows historical time based network traffic data where the network traffic patterns are shown for morning and afternoon. For example, client device 1 has high traffic in the morning and low traffic in the afternoon.

Block 401 shows morning wireless access point assignments. In morning, client devices 2 and 3 are assigned to wireless access point A and client device 1 assigned to wireless access point B. Client device 1 communicates on a radio channel associated with wireless access point B so that it does not create interference on the radio channel of wireless access point A due to the high volume morning network traffic of client device 1.

Block 402 shows client device afternoon wireless access point assignments. The client devices may be assigned to different wireless access points in the afternoon than in the morning due to different past network traffic patterns in the morning than in the afternoon. Client devices 1 and 2 are assigned to wireless access point A, and client device 3 is assigned to wireless access point B.

Figure 5:
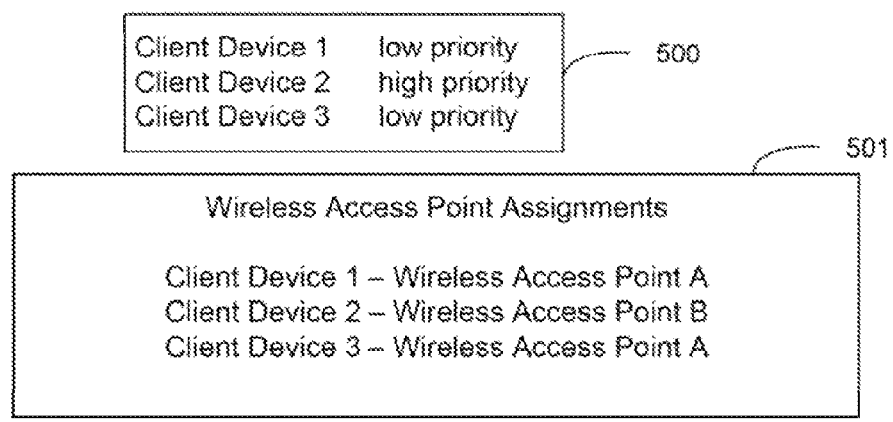
FIG. 5 is a diagram illustrating one example of assigning client devices to wireless access points based on network traffic priorities data.

FIG. 5 is a diagram illustrating one example of assigning client devices to wireless access points based on network traffic priorities data. Block 500 shows historical traffic patterns indicating the priority of network traffic. Client devices 1 and 3 have low priority traffic data, and client 2 has high priority traffic data. Client devices with low priority, client devices 1 and 3, are assigned to a different wireless access point than client devices with high priority network traffic, client device 2. In some cases, client devices with different priority levels may be assigned to the same wireless access point where the configuration is designed to increase the throughout for the higher priority client device.

Figure 6:
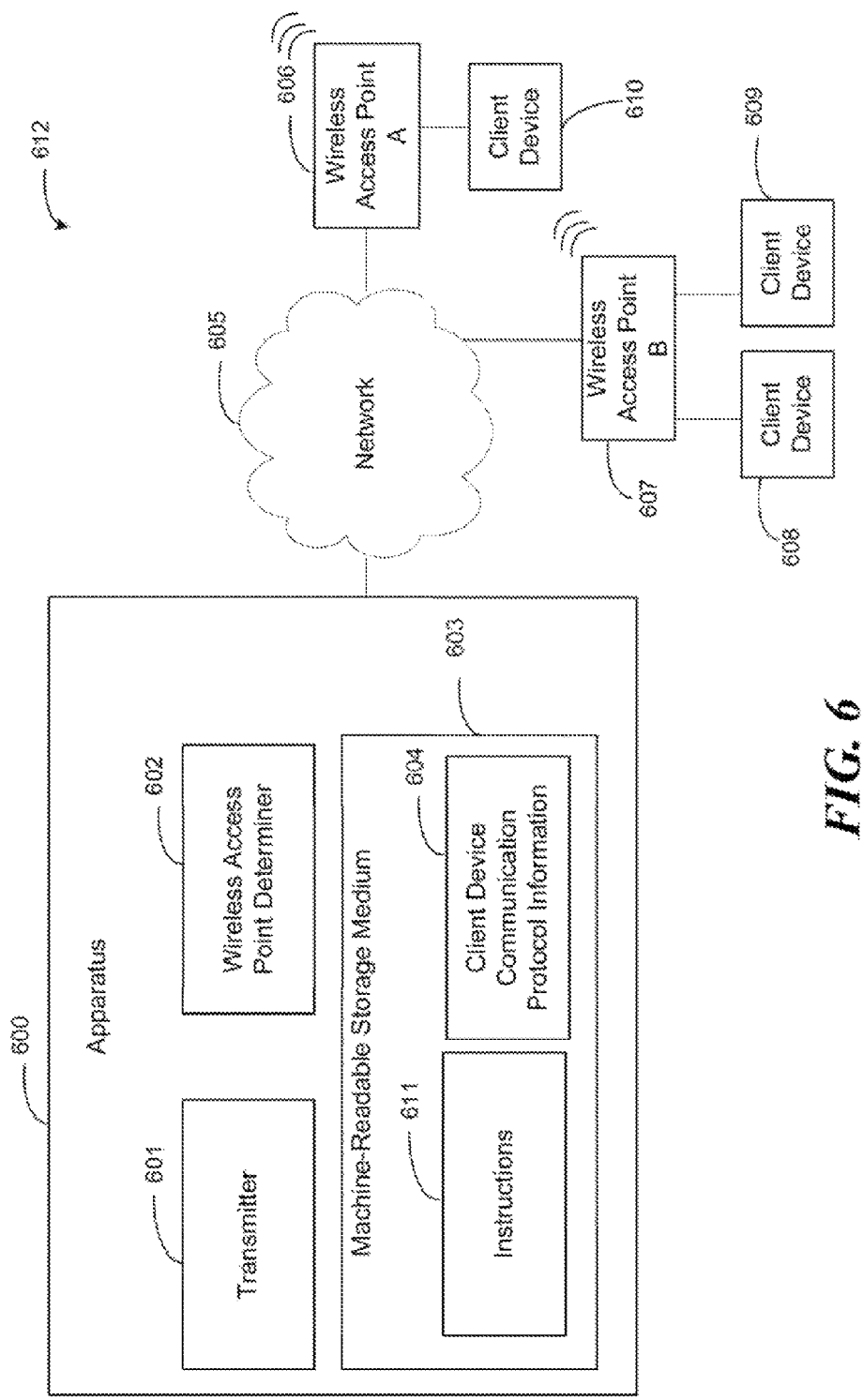
FIG. 6 is a block diagram illustrating one example of a computing system.

FIG. 6 is a block diagram illustrating one example of a computing system 612. The computing system 612 may assign client devices to wireless access points for providing network access to the client devices. The client devices may be assigned to the wireless access points based on the communication protocols of the client devices. For example, client devices communicating with the same communication protocol may he assigned to the same wireless access point. As an example, the client devices may be assigned to the wireless access points in a manner to prevent a wireless anomaly problem caused by client devices using different communication protocols communicating with the same wireless access point. The computing system 612 may include an apparatus 600, a network 605, a wireless access point A 606, a wireless access point B 607, and client devices 608, 609, and 610.

The wireless access point A 606 and the wireless access point B 607 may be any suitable wireless access points. The wireless access points A 606 and B 607 may be used to provide network access to client devices 608, 609, and 610, such as by transmitting information wirelessly via radio frequencies to client devices. In some implementations, the wireless access points A 606 and B 607 may be combined with other network hardware, such as a router.

The client devices 608, 609, and 610 may be desktop, laptop, or mobile computing, or other types of client devices. The client devices 608, 609, and 610 may be client devices that wirelessly connect to the network 605. For example, the client devices 608, 609, and 610 may receive access to the network 605 via a wireless access point, such as wireless access point A 606 or wireless access point B 607. The wireless access points A 606 and B 607 may wirelessly transmit data to the client devices associated with the wireless access points. For example, wireless access point B 607 may wirelessly transmit data to client devices 608 and 809, and wireless access point A 606 may wirelessly transmit data to client device 610.

The network 605 may be, for example, the Internet or a Local Area Network (LAN). The network 605 may be used to communicate information to the wireless access points A 606 and B 607 about which client devices they should associate with. The network 606 may be a wired network for transmitting information to the wireless access points A 606 and B 607, and the wireless access points A 606 and 607 may wirelessly transmit the information to client devices 608, 609, and 610.

The apparatus 600 may be any suitable apparatus for controlling network parameters. For example, the apparatus 600 may be a network controller, such as a wireless Local Area Network (LAN) controller, for controlling wireless access point settings. The apparatus 600 may determine which wireless access point to associate with a client device. The apparatus 600 may include a transmitter 601, a wireless access point determiner 602, and a machine-readable storage medium 603.

The wireless access point determiner 602 may be, for example, a processor, such as a central processing unit (CPU), a semiconductor-bawl microprocessor, or any other device suitable for retrieval and execution of instructions. In one embodiment, the wireless access point determiner 602 includes logic instead of or in addition to a processor. As an alternative or in addition to fetching, decoding, an executing instructions, the wireless access point determiner 602 may include one or more integrated circuits (ICs) or other electronic circuits that comprise a plurality of electronic components for performing the functionality described below. In one implementation, the wireless access point determiner 602 includes multiple processors. For example, one processor may perform some functionality and another processor may perform other functionality.

The machine-readable storage medium 603 may be any suitable machine readable medium, such as an electronic, magnetic, optical, or other physical storage device that stores executable instructions or other data (e.g., a hard disk drive, random access memory, flash memory, etc.). The machine-readable storage medium 603 may be, for example, a computer readable on-transitory medium.

The machine-readable storage medium 603 may include client device communication protocol information 604. The client device communication protocol information 604 may include information about communication protocol used by a client device. The machine-readable storage medium 603 may include instructions 611 executable by the wireless access point determiner 602. In some implementations, the instructions 611 may be in a separate machine-readable storage medium. The instructions 611 may include instructions executable by the wireless access point determiner 602 to assign a client device to a wireless access point based on the client device communication protocol information 604. For example, client devices communicating using a first communication protocol may be assigned to a first wireless access point, and dent devices communicating using a second communication protocol may be .assigned to a second wireless access point.

The transmitter 601 may be, for example, a hardware component of the apparatus 600 for transmitting information via the network 605 to the wireless access points A 606 and B 607. The transmitter 601 may transmit client device assignment information determined by the wireless access point determiner 602 to the wireless access points A 606 and B 607. For example, the transmitter 601 may transmit information to the wireless access point A 606 indicating that client device 608 and client device 609 are assigned to it. The client devices assigned to the wireless access point may communicate wireless via the assigned wireless access point to receive network access.

Figure 7:
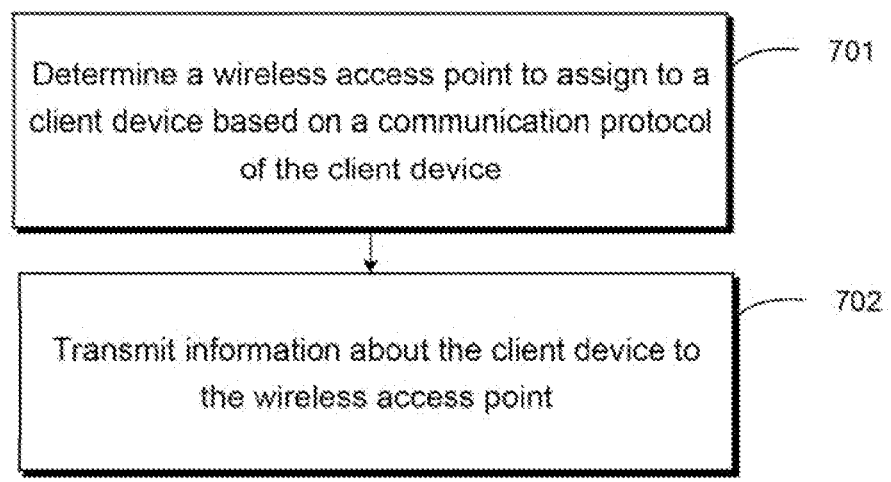
FIG. 7 is a flow chart illustrating one example of a method to assign a client device to a wireless access point based on a communication protocol used by the client device.

FIG. 7 is a flow chart 700 illustrating one example of a method to assign a client device to a wireless access point based on a communication protocol used by the client device. For example, a wireless access point may be used for client devices using a particular communication protocol or a group of communication protocols. Each wireless access point may be configured to support the particular communication protocols. Limiting a wireless access point to a particular set of communication protocols may limit a small number of client devices using a different communication protocol from slowing down network access with the wireless access point. In some cases, the method may result client device being assigned to a wireless access point that is not the closest wireless access point to the client device. The method may be implemented, for example, by the apparatus 700.

Beginning at 701, a wireless access point determiner, such as the wireless access point determiner 602 from FIG. 6, determines a wireless access point to assign to a client device based on a communication protocol of the client device. The wireless access point determiner may receive information about the communication protocol used by the client device. In some implementations, the assignment determiner monitors network traffic from the client device to determine a communication protocol associated with the client device. The wireless access point may be updated, for example, in response to a detection of an updated communication protocol associated with a client device. The wireless access point may be associated with the client device for the client device to access the network by communicating wirelessly with the wireless access point. As an example, a client device may communicate using an 802.11a protocol, and it may be assigned to a wireless access point for communicating with client devices communicating using the 802.11a protocol.

In some implementations, client devices communicating with an older wireless protocol may be assigned to a different wireless access point than a client device communication with a newer wireless protocol. For example, a first wireless access point may be designated as a wireless access point for client devices communicating using 802.11n, and a second wireless access point may be designated for client devices communicating using 802.11a, 802.11b, or 802.11g. In some implementations, the wireless access point determiner determines how to allocate the client devices to wireless access points based on the communication protocols of the client devices attempting to connect to the network, and the wireless access points are not first assigned to a particular communication protocol or set of communication protocols.

In one implementation, the wireless access point is determined based on both the communication protocol and historical network traffic data associated with the client device. For example, the wireless access point may be selected in order to decrease the likelihood of co-channel interference and to group client devices based on their communication protocols. The wireless access point may be determined further based on a priority of the client device, such as a priority determined based on the type of network traffic historically associated with the client device.

Continuing to 702, a transmitter, such as the transmitter 601 from FIG. 6, transmits information about the client device to the wireless access point. For example, the transmitter may transmit information about the client device via a wired network. If the client device attempts to connect to the network, the wireless access point assigned to the client device allows the client device to connect to it to receive access to the network.

Figure 8:
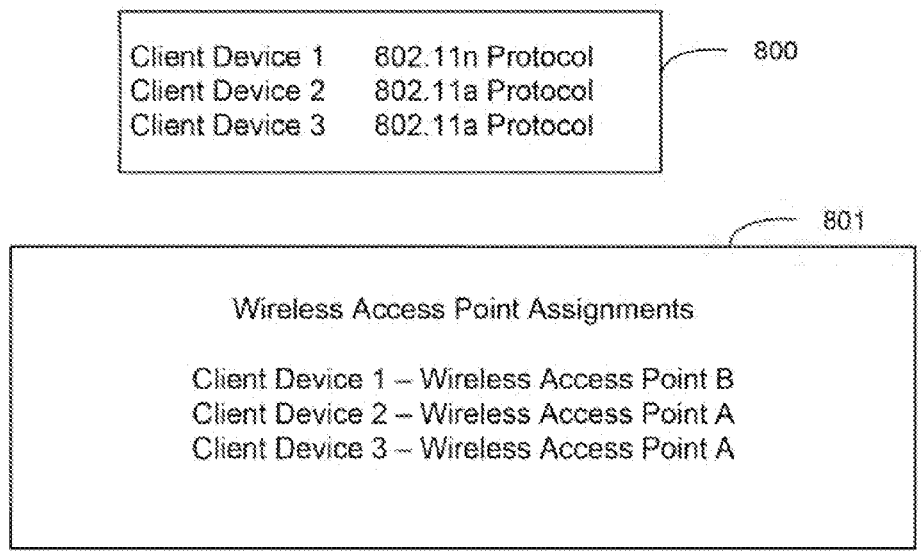
FIG. 8 is a diagram illustrating one example of assigning client devices to wireless access points based on the communication protocols used by the client devices.

FIG. 8 is a diagram illustrating one example of assigning client devices to wireless access points based on communication protocol characteristics of the client devices. Block 800 shows client devices and their associated communication protocols. For example, client device 1 communicates using 802.11n and client devices 2 and 3 communicate using 802.11a. Block 801 shows wireless access point assignments. The client devices 1, 2, and 3 assigned to Fireless access points. For example, client devices communicating using 802.11a are assigned to wireless access point A, and the dent device communicating using 802.11n are assigned to wireless access point B.

Figure 9:
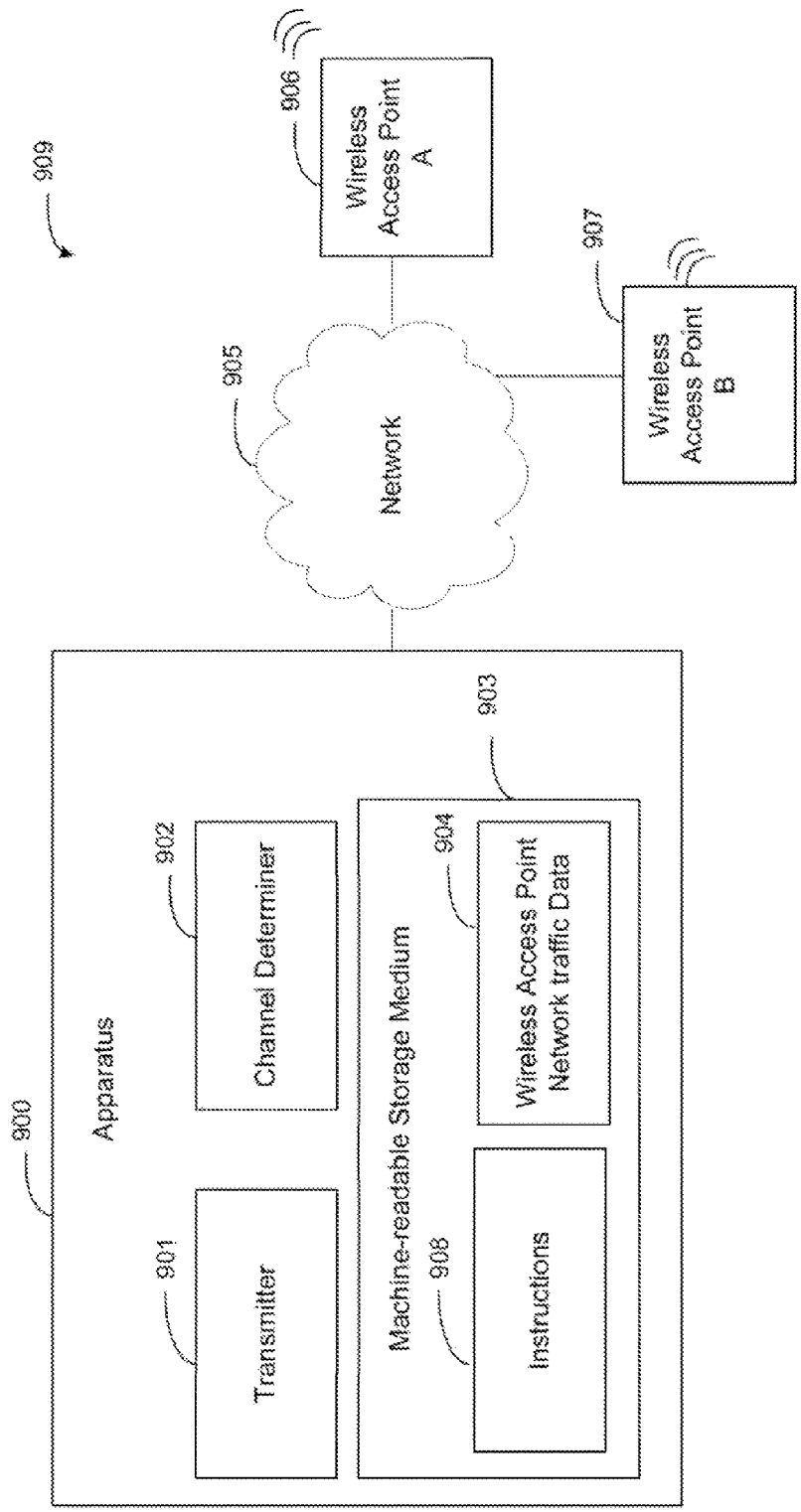
FIG. 9 is a diagram illustrating one example of a computing system.

FIG. 9 is a diagram illustrating one example of a computing system 909. The computing system 909 may be a computing system in which a radio channel is assigned to a wireless access point based on wireless access point network traffic data. For example, historical data of network traffic associated with wireless access points may be analyzed to determine how to assign channels to wireless access points in a manner designed to reduce the likelihood of co-channel interference. The data may be time based such that a wireless access point is assigned a first channel during a first time period and a second channel during a second time period, such as having different channels for morning than for afternoon.

The wireless access point A 906 and the wireless access point B 907 may be any suitable wireless access points. The wireless access points A 906 and B 907 may be used to provide network access to client devices (not shown), such as by transmitting information Wirelessly via radio frequencies to client devices. In some implementations, the wireless access points A 906 and B 907 may be combined with other network hardware, such as a router.

The network 905 may be, for example, the Interpret or a Local Area Network (LAN). The network 905 may be used to communicate information to the wireless access points A 906 and B 907 about which radio channels they Should use to communicate. The network 905 may be a wired network for transmitting information to the wireless access points A 906 and B 907, and the wireless access points A 906 and 907 may wirelessly transmit the information to client devices.

The apparatus 900 may be any suitable apparatus for controlling network parameters. For example, the apparatus 900 may be a network controller, such as a wireless Local Area Network (LAN) controller, for controlling wireless access point settings. The apparatus 900 may determine a radio channel for a wireless access point to use to wirelessly communicate with client devices. The apparatus 900 may include a transmitter 901, a channel determiner 902, and a machine-readable storage medium 903.

The channel determiner 902 may be, for example, a processor, such as a central processing unit (CPU), a semiconductor-based microprocessor, or any other device suitable for retrieval and execution of instructions. In one embodiment, the channel determiner 902 includes logic instead of or in addition to a processor. As an alternative or addition to fetching, decoding, and, executing instructions, the channel determiner 902 may include one or more integrated circuits (ICs) or other electronic circuits that comprise a plurality of electronic components for performing the functionality described below. In one implementation, the channel determiner 902 includes multiple processors. For example, one processor may perform some functionality and another processor may perform other functionality.

The machine-readable storage medium 903 may be any suitable machine readable medium, such as an electronic, magnetic, optical, or other physical storage device that stores executable instructions or other data (e.g., a hard disk drive, random access memory, flash memory, etc). The machine-readable storage medium 903 may be, for example, a computer readable non-transitory medium.

The machine-readable storage medium 903 may include wireless access point network traffic data 904. The wireless access point network traffic data 904 may include historical network traffic data associated with a wireless access point. The historical network traffic data may indicate time based patterns of network traffic. The machine-readable storage medium 903, or a separate storage, may include instructions 908 executable by the channel determiner 902 to assign radio channels to wireless access points based on the wireless access point network traffic data 904. For example, the channel determiner 902 may analyze traffic patterns to determine the degree of interference if a wireless access point shared a radio channel with a nearby wireless access point.

The transmitter 901 may be, for example, a hardware component of the apparatus 900 for transmitting radio channel information via the network 905 to the wireless access points A 906 and B 907. For example, the transmitter 901 may transmit information to the wireless access point A 906 indicating that the wireless access point A 906 should transmit using a particular radio channel. The information may be transmitted to the wireless access points with the associated time information, or the transmitter 901 may transmit the channel information to the wireless access points at the point when the wireless access point should switch radio channels.

Figure 10:
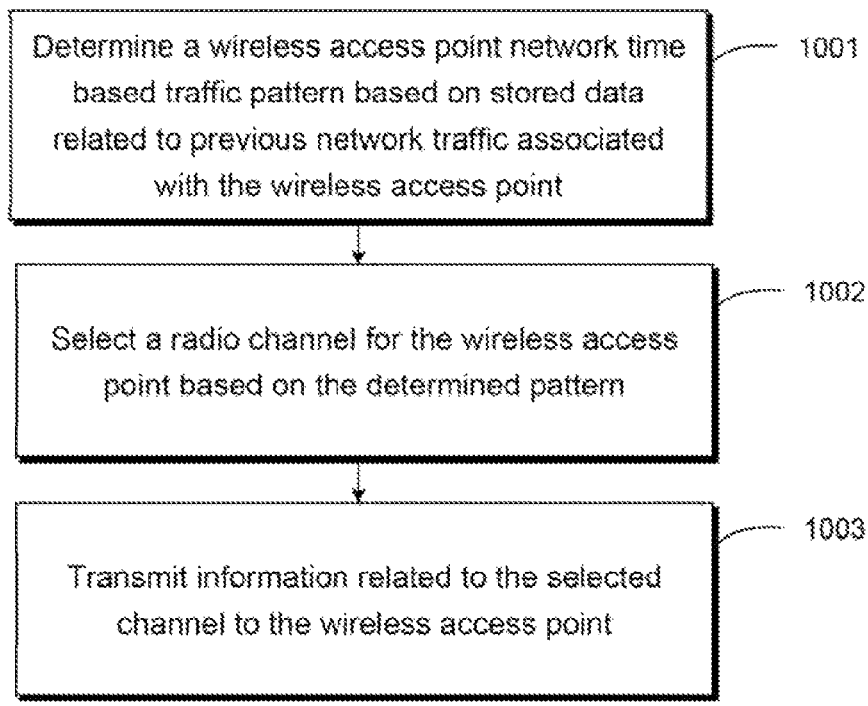
FIG. 10 is a flow chart illustrating one example of a method to assign a radio channel to a wireless access point based on network traffic patterns.

FIG. 10 is a flow chart 1000 illustrating one example of a method to assign a radio channel to a wireless access point based on network traffic patterns. Traffic patterns may be determined for a wireless access point. For example, historical network traffic data may be analyzed to determine typical amounts or types of network traffic during different time periods. The radio channel may be assigned based on the concept that future network traffic is likely to resemble past traffic patterns. The pattern may be used to determine a radio channel to assign to the wireless access point for communicating wirelessly with client devices. The wireless access point may be assigned different channels at different times, such as a first channel during a time identified as a peak traffic time period in the past and a second channel during a time period associated with more moderate network traffic. The radio channel may be assigned in a manner designed to reduce co-channel interference. For example, a wireless access point predicted to have greater traffic based on the historical pattern may be assigned to a radio not assigned to another wireless access point or to a radio channel assigned to a wireless access point predicted to have a lower amount of traffic during the particular time period. The method may be implemented, for example, by the apparatus 900 of FIG. 9.

Beginning at 1001, a channel determiner, such as the channel determiner 902 of FIG. 9, determines a wireless access point network time based traffic pattern based on stored data related to previous network traffic associated with the wireless access point. The channel determiner may store the network traffic data or access data collected by another component, or entity. The network traffic data may indicate the amount and/or type of network traffic received by the wireless access point. The channel determiner may determine a pattern of network traffic based on time periods. The periods may be predetermined, and the channel determiner determines a typical past amount of traffic at each of the predetermined time periods. In one implementation, the channel determiner analyzes the network traffic data and groups the network traffic data into time periods based on the network traffic data. The patterns may be based on, for example, a time of day or day of week. In some cases, the patterns may be related to an area of a building, such as related to a group of wireless access points located in an area of a building.

Continuing to 1002, the channel determiner selects a radio channel for the wireless access point based on the determined pattern. The radio channel may be selected in a manner designed to decrease the likelihood of co-channel interference. For example, if two nearby wireless access points use the same radio channel, the amount of throughput for each wireless access point may be reduced. The radio channel may e selected based on the projected throughput of the radio channel. For example, the projected throughput for each wireless access point may be 50% where two nearby wireless points use the same radio channel. A wireless access point with a greater amount of traffic predicted for a particular time period may be assigned to another radio channel not assigned to other wireless access points to increase the throughput for the fireless access point with greater traffic.

In one implementation, the radio channel is selected based on the priority of wireless access point. For example, a wireless access point in an auditorium may receive a higher priority than a wireless access point covering a guest office. The radio channel may be selected in a manner designed to reduce co-channel interference for a wireless access point with a greater priority.

In one implementation, the traffic pattern is used both for the radio channel assignment and to update which client devices connect to the wireless access point. For example, a wireless access point with a pattern of high traffic during a particular period may not be assigned to an additional client device even if the wireless access point is the closest wireless access point to the client device. Information about the assignment may be transmitted to the wireless access point to be used when the client device attempts to connect to the network.

Proceeding to 1003, a transmitter, such as the transmitter 901 from FIG. 9, transmits information related to the selected channel to the wireless access point. For example, the transmitter may transmit information about the channel to the wireless access point via a wired network, and the wireless access point may the begin communicating with client devices via the selected radio channel. The wireless access point may store information about which radio channel to use during particular time periods. In one implementation, the transmitter transmits information about the radio channel at the beginning of each time period where the wireless access point is determined to switch radio channels.

Figure 11:
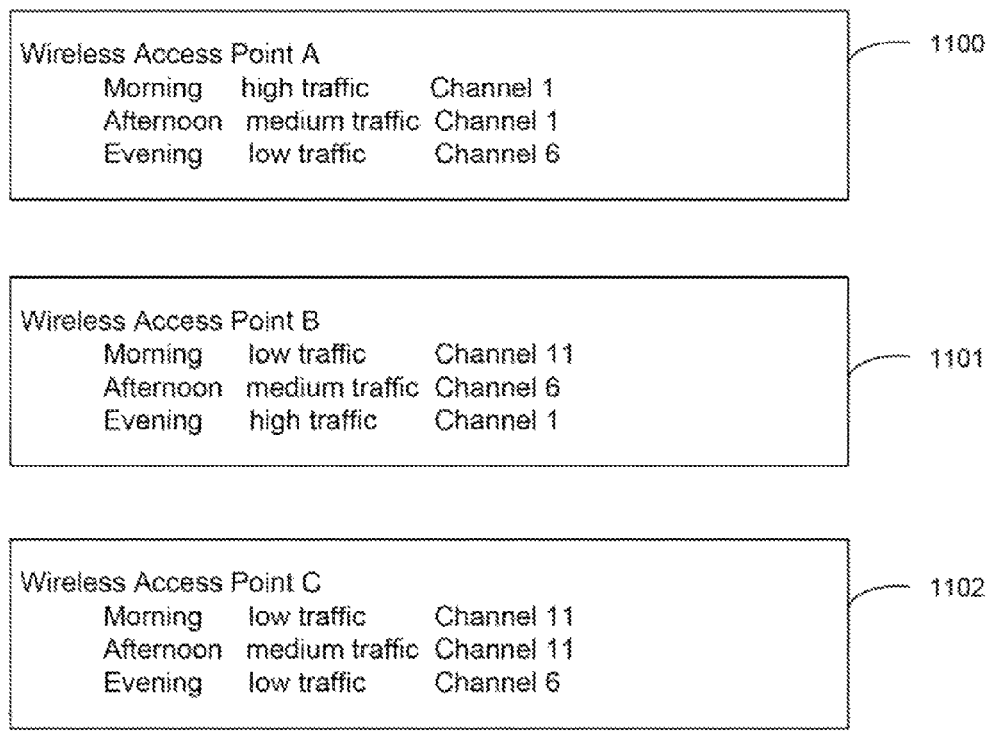
FIG. 11 is a diagram illustrating one example of assigning radio channels to wireless access points based on historical network traffic data.

FIG. 11 is a diagram illustrating assigning radio channels to wireless access points based on historical network traffic data. For example, block 1100 shows channel assignments for wireless access point A, block 1101 shows channel assignment information for wireless access point B, and block 1102 shows channel assignment information for wireless access point C. The channels are assigned such that times of high traffic for a wireless access point do not have the wireless access point sharing a radio channel with another wireless access point with high traffic in order to reduce the likelihood co-channel interference. For example, in the morning, wireless access point A has high traffic and wireless access points B and C have low traffic. Wireless access point A is assigned to radio channel 1, and wireless access points B and C are assigned to radio channel 11.

The invention claimed is:

1. A method, comprising:
   analyzing stored network traffic data associated with a client device;
   grouping client devices including the client device into a plurality of groups based on a type of network traffic accessed by each of the respective client devices;
   determining a time based pattern of network traffic associated with the client device using the analyzed network traffic data;
   determining a wireless access point to assign the client device to based on the time based pattern; and
   transmitting to the wireless access point information about the client device assigned to the wireless access point.

2. The method of claim 1, wherein determining a wireless access point to assign the client device to includes determining a a wireless access point to assign to the client device based on an amount of network traffic associated with the client device.

3. The method of claim 1, wherein assigning a wireless access point to client devices comprises:
   prioritizing the plurality of groups relative to one another; and
   assigning client devices to wireless access points such that client devices in a group among the plurality of groups with a higher priority receive greater network throughput than client devices in a group among the plurality of groups with a lower priority.

4. The method of claim 1, further comprising:
   assigning a radio channel to the wireless access points based on the stored data; and
   transmitting information about the associated radio channel to the wireless access points.

5. The method of claim 1, wherein determining a wireless access point to assign the client device to includes determining a wireless access point to assign to the client device based on a type of network traffic associated with the client device.

6. A non-transitory machine-readable storage medium including instructions executable by a processor to:
   analyze stored network traffic data associated with a client device;
   group client devices including the client device into a plurality of groups based on a type of network traffic accessed by each of the respective client devices;
   determine a time based pattern of network traffic associated with the client device using the analyzed network traffic data;
   determine a wireless access point to assign to the client device to based on a communication protocol of the client device and the time based pattern; and
   transmit information about the assigned client device to the wireless access point.

7. The non-transitory machine-readable storage medium of claim 6, wherein a client device communicating with an older wireless protocol is associated with a different wireless access point than a client communicating with a newer wireless protocol.

8. The non-transitory machine-readable storage medium of claim 6, further comprising determining the wireless access point based on a priority for network connectivity of the client device.

9. The non-transitory machine-readable storage medium of claim 6, further comprising instructions to:
   collect historical data about the communication protocol of the client device; and
   update the determination of the wireless access point based on changes in the communication protocol of the client device.

10. An apparatus, comprising:
    a channel determiner to:
      analyze stored network traffic data associated with a wireless access point
      determine a time based pattern of network traffic associated with the wireless access point using the analyzed network traffic data;
      group client devices including the client device into a plurality of groups based on a type of network traffic accessed by each of the respective client devices;
      select a radio channel to assign to the wireless access point based on the determined time based pattern; and
    a transmitter to transmit information related to the selected channel to the wireless access point.

11. The apparatus of claim 10, wherein selecting the radio channel comprises selecting the radio channel based on the projected throughput of available radio channels.

12. The apparatus of claim 10, wherein the stored network traffic data comprises stored data related to network traffic in at least one of: a time of day, a day of the week, or an area of a building.

13. The apparatus of claim 10, wherein the processor further:
    determines a wireless access point to associate with a client device based on the stored network traffic data; and
    transmits information about the assigned client device to the wireless access point.

14. The apparatus of claim 10, wherein the processor further prioritizes the wireless access points, and wherein selecting the radio channel is further based on the prioritization.

* * * * *